United States Patent

[11] 3,617,933

| | | |
|---|---|---|
| [72] | Inventors | Manabu Yamamoto<br>Odawara-shi, Kanagawa-ken;<br>Shunsuke Tomiyama, Kunitachi-shi,<br>Tokyo-to; Akira Hashimoto, Kodaira-shi,<br>Tokyo-to; Susumu Saito, Hachioji-shi,<br>Tokyo-to, all of Japan |
| [21] | Appl. No. | 834,044 |
| [22] | Filed | June 17, 1969 |
| [45] | Patented | Nov. 2, 1971 |
| [73] | Assignee | Kabushiki Kaisha Hitachi Seisakusho<br>Tokyo-to, Japan |
| [32] | Priority | June 21, 1969 |
| [33] | | Japan |
| [31] | | 44/43292 |

[54] METHOD FOR GENERATING OSCILLATION IN KRYPTON LASER
3 Claims, 1 Drawing Fig.

[52] U.S. Cl. .................................................... 331/94.5
[51] Int. Cl. ..................................................... H01s 3/09
[50] Field of Search ........................................... 331/94.5;
330/4.3

[56] References Cited
OTHER REFERENCES

Allen et al., New Laser Oscillations in Krypton and Xenon, IEEE J. Quanti Elect., Vol. QE-2, No. 8 (Aug. 1966) pg. 334
Ahmed et al., Gas Lasers in Magnetic Fields, Proc. IEEE, Vol. 52, No. 11 (Nov. 1964) pp. 1356–1357
Singly-Ionized Krypton and Xenon Laser Action Studied, Laser Focus (Jan. 15, 1965) pg. 8

*Primary Examiner*—William L. Sikes
*Attorneys*—Robert E. Burns and Emmanuel J. Lobato ABSTRACT: Disclosed herein is a method for obtaining oscillation in krypton ion gas laser, wherein such oscillation is not subject to the phenomenon of instability which method is carried out by causing laser oscillation with high discharge current density in a capillary discharge tube filled with a discharge gas consisting principally of krypton, at a pressure which exceeds a predetermined value related to the discharge current density.

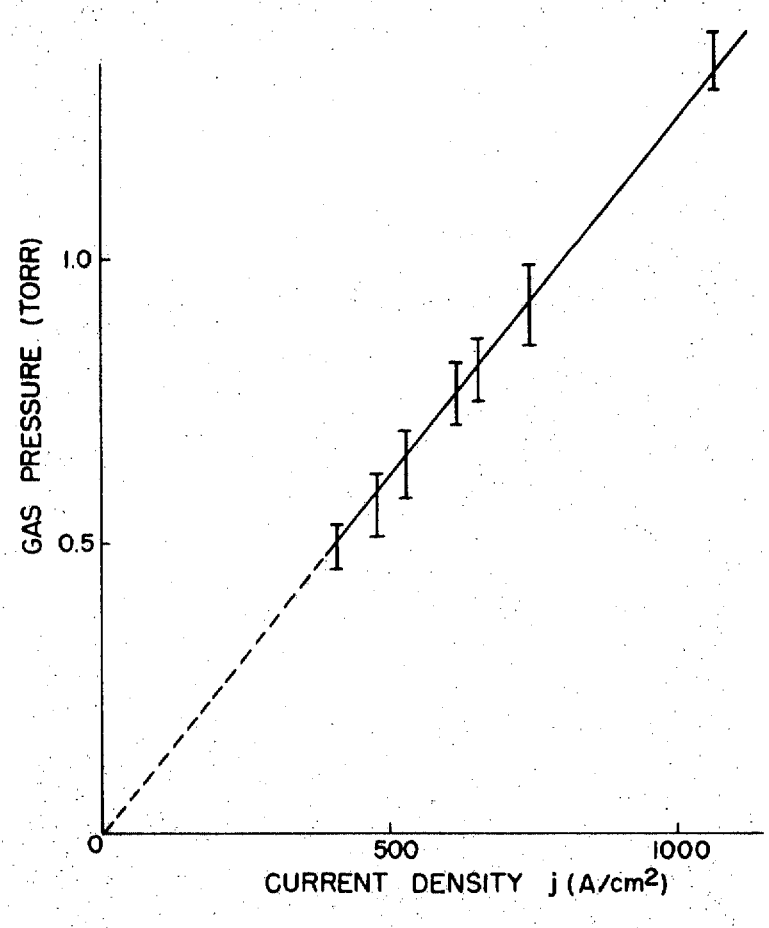

METHOD FOR GENERATING OSCILLATION IN KRYPTON LASER

This invention relates to a krypton ion laser, and more particularly to a method for preventing instability in the discharge of the device which is liable to occur in high current ion lasers, and for operating such a device in a stable manner.

Heretofore, it has been widely known that lasers using rare gases such as neon, argon, krypton, etc., as the active material, operate in the visible or ultraviolet region to produce continuous wave (CW) oscillation, whereby a relatively high power output is obtainable.

However, as these lasers oscillate at a frequency corresponding to an ionic spectrum line of the above-mentioned rare gases, the upper level of the oscillation line is at a considerably high energy level. In order to excite the ionized gases to such a high energy level to generate the ion laser, it is necessary to carry out high current density discharge with a current of several hundred amperes per cm.$^2$ in a long, thin capillary discharge tube having a reduced inner diameter, normally in a range of about 3 to 5 mm.

We have found, however, that in such a case a phenomenon of plasma instability is created while the current density is being increased to the above-described value, and, upon the occurrence of such instability, the discharge current is interrupted periodically at a rapid frequency of about 1 MHz. or more. When such condition continues for about 1 millisecond, the laser resumes its normal stable operation for 2 or 3 seconds, but, thereafter, it is again thrown into another unstable state. During these unstable periods, the laser oscillation is substantially stopped. In some cases, the discharge may also be stopped in such periods, and is not reignited.

Therefore, it is apparent that the laser accompanied by such instability is not suitable for the purpose of continuous laser oscillation, and some measures must be taken for preventing this instability.

For this reason, the principal object of the present invention is to provide an improved method for operating krypton gas lasers, wherein measures for preventing the above-described instability are taken.

It is another object of the present invention to provide an improved method for obtaining continuous, stable oscillation in krypton lasers, wherein pure krypton or a gas mixture consisting of krypton as a principal component and other rare gases is used as the active material for the lasers, while the current density $j$ of the discharge current in the capillary portion included in the discharge tube of the laser is determined to be a value higher than 500 a./cm.$^2$, and the initial filling pressure of the above-described mixed gas is selected to be a value higher than $1.2 \times 10^{13} j$.

The nature, principle, and utility of the invention will be more apparent from the following detailed description when read in conjunction with the accompanying drawing.

In the drawing, the single FIGURE is a graphical representation of a current density versus critical gas pressure characteristics, for facilitating an explanation of the principle of the present invention.

As a result of our study to determine the reasons for the above-described instability, in which various factors such as the size of the discharge tube, kind and pressure of the operating gas, the discharge current, and the intensity of the magnetic field applied from outside of the discharge tube, etc. are widely changed, it has been found that the instability was created under the action of a self-pinching effect of the discharge path and that the discharge current could be stabilized by suitably determining these conditions.

More specifically, the self-pinching effect is created under a mutual action between the discharge current and the magnetic field caused thereby, the directions of the forces thus created being such that the path of the discharge current is thereby constricted, and the magnitude of the forces (magnetic pressure) is determined by $B^2/8\pi$, wherein B represents the intensity of the magnetic field. For example, when a discharge current of 40 a. is applied to a discharge tube of 3 mm. inner diameter, the magnetic pressure to be obtained will be approximately 0.1 torr. On the other hand, the pressure of the gas sealed within the ion laser discharge tube is normally in a range of 0.3 to 1 torr. Of this total pressure of the gas, the partial pressure for electrons—the carrier of the discharge current—is approximately one half. Accordingly, it may be understood that there is sufficient possibility for creation of the above-described magnetic pinch effect in the discharge tube.

Although the above-mentioned reasoning for the magnetic pinch effect must, strictly speaking, take into consideration various factors such as the degree of ionization of the gas, the nonequilibrium between electron temperature and gas temperature, and the condition of the boundary layer near the tube wall, this concept could be well verified by the results of various experiments. That is, as far as these various factors remain unchanged, the discharge current is maintained stable as the inner diameter of the capillary tube becomes increased. The reason for this improvement in the stability is attributable to the fact that the magnetic pressure inside of the tube is thereby reduced. With respect to the deterioration of stability with the lowering of the gas pressure and increase in of the discharge current, experimental results agree with theoretical prediction. Furthermore, the possibility of instability was increased by the application of a magnetic field in the direction of the longitudinal axis of the discharge tube, the reason for which is considered to reside in a variation in the plasma state in the discharge tube.

As is apparent from the above description, the instability in ion lasers can be prevented by appropriately selecting the operating conditions. The instability occurs more significantly in lasers using heavier gases. Such practical difficulty arises remarkably with those gases having larger atomic weight, particularly in the krypton ion laser which occupies important position as a source of red laser beam. The measure of preventing such instability will therefore be described with respect to the krypton laser.

The discharge tubes employed in the experiment were made of beryllia each having an inner diameter of 2 to 5 mm., a length of 350 to 450 mm., and being provided with a cathode at one end and an anode at the other end thereof. Through these electrodes, a discharge current of a maximum value of 80 a. was passed.

The characteristic curve shown in the drawing indicates the critical gas pressures, at which the instability in the operation of the discharge tubes occurs. It is apparent from this characteristic curve that when the magnetic field applied from outside of the discharge tube is of a constant value, the curve takes a substantially rectilinear configuration. If the magnetic field applied from outside is comparatively weak such as about 100 gausses or less, the empirical equation representing this rectilinear line will be:

$$P = |1.2 \times 10^{13} j|$$

where $P$ designates the pressure of the gas (in torr), and $j$ designates the current density (a./cm.$^2$) of the discharge current.

When the discharge tube is operated in the upper region of the line, the discharge current is stable, but in the lower region of the line, the discharge current is unstable. When the magnetic field is imparted, the critical pressure with respect to the same current density is increased. For instance, when the current density is about 700 a./cm.$^2$, if a magnetic field of about 600 gausses is applied in the longitudinal direction of the discharge tube, the critical pressure is increased by 1.6 times relative to the original value, and this multiplication factor does not change very much by the density of the discharge current. It is also found that the application of the external magnetic field along the longitudinal axis of the discharge tube is effective in increasing the laser efficiency, the optimum value of the magnetic field therefor being in a range of from about 600 to 1,200 gausses.

The gas pressure given by the above equation is the minimum allowable limit to maintain stable discharge, and, when a magnetic field is applied, it is advisable to initiate a discharge with a gas pressure higher than that indicated above.

The present invention exhibits its effectiveness in a krypton ion laser of a larger output, wherein the instability due to the pinch effect becomes a serious problem, and wherein the density of the discharge current is more than 500 a./cm.$^2$. At a current density lower than this value, development of the instability becomes gradual with the result that the discharge tube may operate temporarily in a stable manner.

As is apparent from the above description, the present invention is based on theoretical and experimental studies on the true nature of the phenomenon of the instability in the ion laser and, as a result thereof, affords a preventive measure against this instability.

Various operational examples of the krypton lasers constituting preferred embodiments of the present invention will now be described hereinbelow. In the following description, the output of the laser consists of the sum of the outputs for two spectrum lines existing in the red color region (the wavelengths of which are 6,471 A and 6,764 A, respectively), these red lines being well known as important light sources in the laser displaying technique.

EXAMPLE 1

Discharge tube: A capillary tube made of beryllium oxide, with an inner diameter of 3mm., an outer diameter of 10mm., a length of 430mm., and provided with a water-cooling system.
Gas pressure: 1.6 torr (initial filling pressure)
Discharge current: 50a.
Discharge voltage: 270v.
Magnetic field: 200gausses
Coupling of optical resonator: 2%
Output: 2.5 w.

EXAMPLE 2

Discharge tube: A capillary tube made of beryllium oxide, with an inner diameter of 4mm., an outer diameter of 8mm., a length of 400mm., and provided with a water-cooling system.
Gas pressure: 1.0 torr (initial filling pressure)
Discharge current: 55a.
Discharge voltage: 160v.
Magnetic field: 500gausses
Coupling of optical resonator: 1%
Output: 2.2 w.

A krypton ion laser which can produce 2 watts or more of output at the red line frequencies has heretofore been unknown, but such a laser has been realized by means of the stable discharge tube according to the present invention.

The stability in discharge as has been discussed in the foregoing can be effectively attained by using either low-frequency alternating current or direct current.

For the purpose of suppressing the instability, a gas mixture of krypton and other lighter gases such as argon, neon, helium, etc., may also be employed in the discharge tube. In this case, the discharge current may be stabilized if the total pressure of the component gases is within the above-described range for the stabilized operation.

The foregoing description has been made for defining an operable region of the method according to the present invention from the standpoint of a stable operation of the discharge tube. On the other hand, however, the output power of the laser oscillation also depends on the initial filling pressure of the discharge gas, so that there naturally exists a preferable operating region to be defined in terms of the laser output characteristics. According to these characteristics, the laser output generally lowers with increase in the filling pressure beyond its critical value. It is therefore not advisable from the point of the laser output characteristics to fill the discharge gas in the discharge tube at a pressure of more than three times as high as its critical value.

Thus, it is apparent that the krypton ion lasers of stable operation and of high output can be obtained in accordance with the present invention, and the fact that a high-power laser light in a visible range, particularly in its red color region, is made obtainable is highly advantageous in the laser display technique.

What we claim is:

1. A method of generating continuous laser oscillations in a gas laser capillary discharge tube, comprising the steps of filling said tube with a gas including krypton to a pressure measured in torr which is greater than $1.2 \times 10^{13}$ times the magnitude of current density at which the laser is operated as measured in a./cm.$^2$, and operating said discharge tube at a high current density of more than 500 a./cm.$^2$, where cm.$^2$ is the cross-sectional area of said tube.

2. A method of generating continuous laser oscillations as set forth in claim 1, comprising the further step of externally applying a magnetic field of from about 600 to 1,200 gausses along the longitudinal axis of said discharge tube.

3. A method of generating continuous laser oscillations as set forth in claim 1, in which said step of filling said discharge tube with gas is performed by charging said tube with pure krypton.

* * * * *